Figure 2:
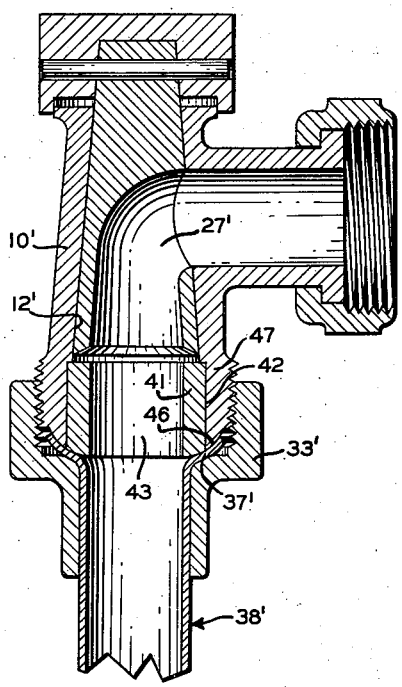

July 25, 1961    J. L. FORD    2,993,677
VALVE CONSTRUCTION
Filed March 21, 1958

INVENTOR.
JOHN L. FORD
BY
*Harold B. Hood*
ATTORNEY

United States Patent Office 2,993,677
Patented July 25, 1961

2,993,677
VALVE CONSTRUCTION
John L. Ford, Wabash, Ind., assignor to The Ford Meter Box Company, Inc., Wabash, Ind., a corporation of Indiana
Filed Mar. 21, 1958, Ser. No. 722,886
3 Claims. (Cl. 251—148)

This invention relates to improvements in valves and may more particularly relate to the provision in an angle valve of improved means for connecting the valve to ductile tubing such as, for example, copper tubing.

In the water works industry the standard type of coupling for connecting to copper service tubing includes a male threaded member with a rounded or beveled nose against which the flared end of the copper tubing is held in fluid-tight fashion by means of an internally threaded nut received upon the male threaded member. In certain applications it is desirable that a certain type of angle valve be used, said angle valve including a rotatable key with passage therethrough for controlling the flow of fluid through the valve. It is further desirable that the above mentioned standard type of coupling be used in connecting between such a valve and copper tubing for a number of reasons, namely, easy efficient installation of the coupling, commercial acceptance of the coupling, and others.

Prior to the present invention, however, such a standard type of coupling was not used with this type of valve perhaps because of the following reason. Obviously, it is highly desirable that the transverse dimensions of passages within the valve and at the connections of the valve to adjacent conduits be substantially the same as the transverse dimensions of the passages within the conduits themselves; however, in order to permit insertion of the valve key during the assembly of the valve, the transverse dimension of the valve body passage through which the key is inserted must be materially greater than the transverse dimension of the tubing to be connected to the valve. For this reason with this type valve such nonstandard couplings were used as externally threaded coupling nuts which have not proved to be completely satisfactory.

It is therefore an object of the present invention to provide an improved valve incorporating improved means for connecting to a conduit.

A further object of the present invention is to provide, in an improved angle valve of the type having a key for the control of fluid flow therethrough, means making possible a standard type of connection between a flared conduit and the valve.

Still further objects will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
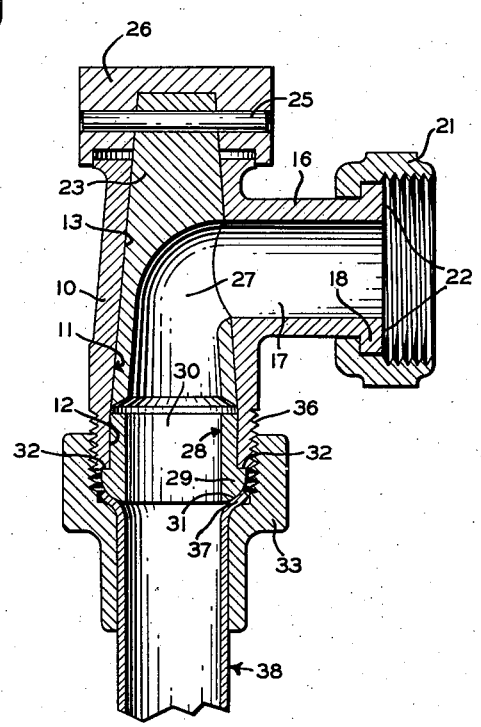

FIG. 1 is a section of an angle valve embodying the elements of the present invention; and FIG. 2 is a section of a similar angle valve forming an alternative embodiment of the present invention.

Referring now to the drawings, and more particularly to FIG. 1, an angle valve is depicted including a body member 10 having an opening indicated generally at 11 extending longitudinally therethrough. The opening 11 has a cylindrical portion 12 at one end thereof and tapers at 13 in a frusto-conical shape of decreasing diameter from the cylindrical portion 12 of the opening 11 to the opposite end thereof. Arm 16 extends laterally from the side of the body member 10 and terminates in a radially extending flange 18 which loosely retains a coupling nut 21 upon the arm 16. The arm 16 has a passage 17 therein of a given constant diameter which communicates between the frusto-conical portion 13 and the outside of the arm 16. The coupling nut 21 may be used in conjunction with an outwardly facing portion 22 of the arm 16 to provide a fluid-tight connection between the passage 17 and a suitably externally threaded conduit (not shown) by rotating the nut 21 so as to draw up the end of the conduit into abutting relationship with the outwardly facing portion 22.

A frusto-conically shaped key 23 is rotatably received within the frusto-conical portion 13 of the body member 10 and has a head member 26 fixed to the outwardly extending smaller end thereof by means of a pin 25 or by any other suitable means. A passage 27 in the key 23 communicates between the side of the frusto-conical key 23 and the base thereof. The passage 27, which is of approximately the same size as the passage 17, so opens on the side of the key 23 that it may be rotated into registry with the passage 17 (as shown in FIG. 1) by rotation of the head member 26 and resulting rotation of the key 23.

A ring indicated generally at 28 is fixed by means of a press fit within the cylindrical portion 12 of the opening 11, so that the passage 30 through the ring 28, which passage is of a size approximately equal to that of the passages 17 and 27, is in registry with the base opening end of the passage 27. The ring 28 has an enlarged portion 29 which extends outwardly of the body member 10 and has an external surface 31 which is rounded off and shaped generally in the form of one-quarter of a tore. The enlarged portion 29 has an annular abutment face 32 upon which, during assembly of the ring 28 with the body member 10, a small amount of joint compound may be placed, thus insuring along with the above-mentioned press fit, a fluid-tight connection between the ring 28 and the body member 10.

The flared end 37 of copper or other ductile tubing 38 may be drawn tightly against the external surface 31 of the ring 28 by means of an internally threaded coupling nut 33 received upon external threads 36 of the body member 10 surrounding the cylindrical portion 12 of the opening 11. The generally toric shaped external surface 31 then forms a portion of a thoroughly fluid-tight connection between the valve and the copper tube 38.

It should be noted that in the manufacture of a valve such as above described, it is necessary that the portion 12 of the opening 11 must be at least as large as the largest transverse dimension of the key 23 so that the key 23 may be assembled within the body member 10 by insertion through the larger mouth of the opening 11 which is formed by the portion 12. As can be seen from an inspection of FIG. 1, the diameter of the cylindrical portion 12 is slightly greater than the diameter of the base of the key 23.

Referring now to FIG. 2, an alternative angle valve also embodying the present invention is identical in all respects to the embodiment above described except as distinguished below. The ring 28 is replaced by a ring 41 which is also press fitted within a cylindrical portion 42 of the opening 12′. Similarly to the above described valve, the passage 43 extending through the ring 41 is of approximately the same size as the key passage 27′ and is in registry therewith. The lower ends of the body member 10′ and the ring 41 are machined, after insertion of the ring 41, to dispose the lower end (as viewed in FIG. 2) of the ring 41 and the lower extremity of the body member 10 in a common, part-spherical surface 46. The lower extremity 47 of the body member 10' is externally threaded to receive a coupling nut 33'.

The connection between the valve and a copper tubing 38' is effected in a manner similar to the connection described above. The flared end 37' of the copper tubing 38' is drawn tightly against the common, part-spherical surface 46 by means of rotation of the coupling nut 33'.

I claim as my invention:

1. A valve connectible to ductile tubing comprising a body member having an opening, a key received within said opening, said opening being at least as large at its mouth as the width of said key whereby said key may be assembled within said opening by insertion through the mouth of said opening, said key having a passage which opens toward the mouth of said opening, a generally cylindrical ring permanently press fitted within the mouth of said opening, the passageway through said ring being approximately equal in size to and registering with the passage of said key, the outwardly-facing end surface of said ring and the adjacent surrounding portions of said body member being shaped in a common part-spherical surface so that the flared end of a ductile tube may be forced thereagainst in registry with said passage to provide a fluid-tight connection, said body member being externally threaded at its mouth, and an internally threaded nut mounted on said threaded mouth for drawing the flared end of such ductile tube tightly against said common part-spherical surface of said ring and said body member and in registry with said passageway.

2. An angle valve connectible to ductile tubing comprising a body member having an opening extending longitudinally therethrough, said opening being cylindrical at one end and of a frusto-conical shape at the other end thereof, the diameter of said frusto-conical portion being at least as small as said cylindrical portion adjacent said cylindrical portion and decreasing toward said other end thereof, said body member having an arm projecting laterally from the side thereof through which a passage of a constant given size communicates between the frusto-conical portion of said body member and the outside of said arm, means associated with said body member for connecting the outwardly opening end of said passage to a conduit, a frusto-conically shaped key rotatably received in the frusto-conical portion of said opening, said key having a passage of approximately the given size communicating between the base of said key and the side thereof, the passage opening in the side of said key being so located that said key may be rotated until its passage is in registry with said first-mentioned passage, a generally cylindrical ring permanently press fitted within the cylindrical end of said opening, the passageway through said ring being of the given size and registering with said second mentioned passage, the surface of said ring which faces outwardly of said body member and the adjacent surrounding portions of said body member being shaped in a common part-spherical surface so that the flared end of a ductile tube may be forced thereagainst in registry with said passage to provide a fluid-tight connection, and a nut for drawing the flared end of such a tube against said common part-spherical surface of said ring and said body member, said body member being suitably externally threaded around the cylindrical opening end thereof for reception of said nut.

3. A valve connectible to ductile tubing comprising a body member having an opening therethrough, a key received within said opening and having a passage therethrough, one end of which opens toward the outside of said body member through one mouth of said opening, said opening being at least as large at said mouth as the width of said key whereby said key may be assembled within said body member by insertion through said one mouth of said opening, said body being formed to provide an axially-facing seat surrounding said mouth at an extremity of said body, a ring formed to provide a shank portion permanently press fitted within said mouth and a radially-enlarged flange portion disposed outside said mouth, the external dimensions of said shank portion being uniform substantially from end to end thereof, the proximal surface of said flange portion being seated upon said body seat and the distal surface of said flange portion being rounded, and the bore of said ring being approximately the same size as said passage through said key and registering therewith, said body member being externally threaded at said one mouth, and an internally threaded nut engageable with said threaded mouth for drawing the flared end of a ductile tube tightly against the externally rounded surface of said ring flange and in registry with said passage.

References Cited in the file of this patent

UNITED STATES PATENTS

| | | |
|---|---|---|
| 862,826 | Kieren | Aug. 6, 1907 |
| 1,430,361 | Cullison | Sept. 26, 1922 |
| 1,801,376 | Sutliff | Apr. 21, 1931 |
| 1,818,255 | Hitchcock | Aug. 11, 1931 |
| 1,959,314 | Wile | May 15, 1934 |
| 2,332,354 | Stecher | Oct. 19, 1943 |
| 2,332,355 | Stecher | Oct. 19, 1943 |
| 2,430,657 | Zolleis | Nov. 11, 1947 |
| 2,529,534 | Beerli | Nov. 14, 1950 |
| 2,555,483 | Grant | June 5, 1951 |
| 2,824,756 | Wagner | Feb. 25, 1958 |

FOREIGN PATENTS

| | | |
|---|---|---|
| 4,748 | France | July 13, 1905 |
| | Addition | |

OTHER REFERENCES

Page 25 of "Ford-Setting and Testing Equipment for Water Meters," Catalog No. 46.